(12) United States Patent
Guard et al.

(10) Patent No.: US 6,837,460 B2
(45) Date of Patent: Jan. 4, 2005

(54) INTEGRATED CONFORMAL VEHICLE INTERIOR LININGS

(75) Inventors: Peter S. Guard, Sammamish, WA (US); Karen L. Hills, Everett, WA (US); Kari L. Erkkila, Seattle, WA (US); Eric A. Bryan, Everett, WA (US); Ryan B. Sparks, Everett, WA (US); William C. Quan, Newcastle, WA (US); Charles K. Lau, Mukilteo, WA (US)

(73) Assignee: The Boeing.Company, Chicago, IL (US)

( * ) Notice: Subject to any disclaimer, the term of this patent is extended or adjusted under 35 U.S.C. 154(b) by 0 days.

(21) Appl. No.: 10/377,593

(22) Filed: Feb. 28, 2003

(65) Prior Publication Data

US 2004/0195445 A1 Oct. 7, 2004

(51) Int. Cl.[7] ............................................... B64D 11/00
(52) U.S. Cl. .................... 244/118.5; 296/214; 296/215; 362/459; 362/471
(58) Field of Search ........................ 244/118.5, 118.6; 296/214, 215; 362/459, 471

(56) References Cited

U.S. PATENT DOCUMENTS

| 4,214,788 A | * | 7/1980 | Srock ......................... 296/39.1 |
| 4,717,199 A | * | 1/1988 | Kohlpaintner et al. ...... 296/214 |
| 5,129,597 A | | 7/1992 | Manthey et al. .......... 244/118.5 |
| 5,857,736 A | * | 1/1999 | Feathers ..................... 296/214 |
| 5,893,603 A | * | 4/1999 | Viertel et al. ................ 296/214 |
| 5,921,620 A | * | 7/1999 | Youens ........................ 296/214 |
| 6,612,640 B2 | * | 9/2003 | Hock et al. ............... 296/146.7 |

* cited by examiner

Primary Examiner—J. Woodrow Eldred
(74) Attorney, Agent, or Firm—Black Lowe & Graham PLLC

(57) ABSTRACT

A vehicle ceiling lining structure is provided. Each ceiling lining structure includes a frame formed in accordance with a section of a ceiling of an aircraft, a fabric attached to the frame, and mounts for attaching the frame to the ceiling. The structure includes a light that is attached to the frame in order to backlight the fabric. A light enhancement film is attached to the frame for dispersing the light. A back panel is attached to the frame to keep condensation away from the vehicle cabin. The frame includes one or more molded plastic parts that allow quick release from the mounts.

29 Claims, 4 Drawing Sheets

INTEGRATED CONFORMAL VEHICLE INTERIOR LININGS

FIELD OF THE INVENTION

This invention relates generally to vehicle interior linings and, more specifically, to aircraft interior linings.

BACKGROUND OF THE INVENTION

Linings for interiors of vehicles are currently made from a crushed core of up to three plies of prepreg, one layer of a honeycomb core, and decorative laminate. As such, raw material, tooling and processing for aircraft interior linings are very expensive. This is the case even when sections, such as a ceiling, to be covered with a lining have a consistent shape. However some interior sections, such as a ceiling of an aircraft, may have a non-consistent ceiling. In this case, the costs are greatly enhanced. This is because varying types of currently-known panels must be created in order to accommodate the non-consistently-shaped ceiling.

It would be desirable to cover non-consistent interior sections of vehicles without resorting to designing and fabricating several, varying types of currently-known panels. However such use of varying types of currently-known panels is the method currently used for lining non-consistently shaped interior sections. Therefore, there exists an unmet need for a low-cost, easy-to-produce, adaptable interior lining for aircraft.

SUMMARY OF THE INVENTION

The present invention provides a structure that utilizes low-cost components built in a low-cost manner for covering a portion of a vehicle ceiling, such as aircraft, trains, or busses. The manufacturing of the structure is easily adaptable for creating various sized and shaped ceiling covering structures.

The present invention provides one or more ceiling lining structures for a vehicle such as an aircraft. Each structure includes a frame formed according to a section of a ceiling of an aircraft, a fabric attached to the frame, and mounts for attaching the frame to the ceiling.

In one aspect of the invention, the structure further includes a light, such as LEDs or fiber optic filaments, that is attached to the frame in order to backlight the fabric.

In another aspect of the invention, a light enhancement film is attached to the frame.

In still another aspect of the invention, a back panel is attached to the frame to keep condensation away from the aircraft cabin.

In yet another aspect of the invention, the frame includes one or more molded plastic parts that allow quick release from the mounts.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, the present invention provides a structure for covering a portion of a vehicle ceiling, such as aircraft, trains, or busses. The structure utilizes low-cost components built in a low-cost manner as compared with present ceiling linings. The manufacturing of the structure is easily adaptable for creating various sized and shaped ceiling covering structures. The ceiling structure of the present invention is suitably backlit and is suitably formed with a semi-permeable material that allows for airflow, thereby reducing the cost of ducts and vents used in traditional (aircraft) ceilings.

Figure 1:
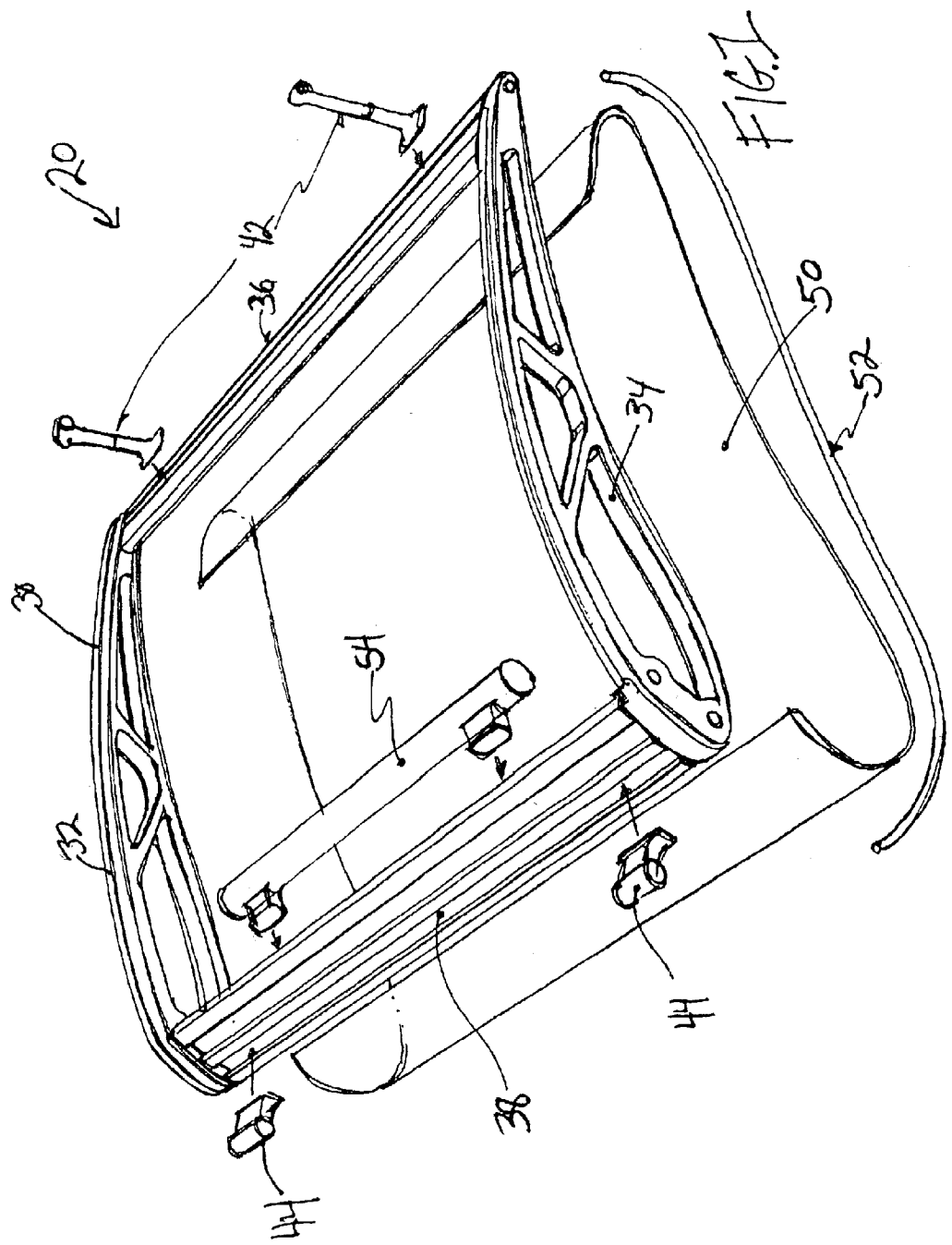
FIGS. 1 and 2 illustrate perspective drawings of a ceiling structure formed in accordance with the present invention.

FIG. 1 illustrates a top-down, perspective view of an example ceiling structure section 20. The ceiling structure section 20 includes a semi-rigid frame 30, a covering material 50, mounts 42 and 44, one or more lights 54, and one or more securing splines 52. The frame 30 includes two side frames 32 and 34 that attach at their ends to first and second crossbeams 36 and 38. The first crossbeam 36 includes one or more receiving slots that receive the mounts 42. The second crossbeam 38 includes one or more slots that receive the mounts 44. The second crossbeam 38 also receives the light 54. The connections of the mounts 42 and 44 to the crossbeams 36 and 38 advantageously allow for quick release of the frame 30 from the mounts 42 and 44. The mounts 42 and 44 are advantageously attached to the ceiling (not shown).

The frame 30 is suitably made from a light-weight rigid or semi-rigid, non-flammable material. A non-limiting example of the frame 30 is made of molded plastic. It is appreciated that the crossbeams 36 and 38 can be attached to the side frames 32 and 34 by various methods, such as without limitation snap fittings or fasteners.

Figure 2:
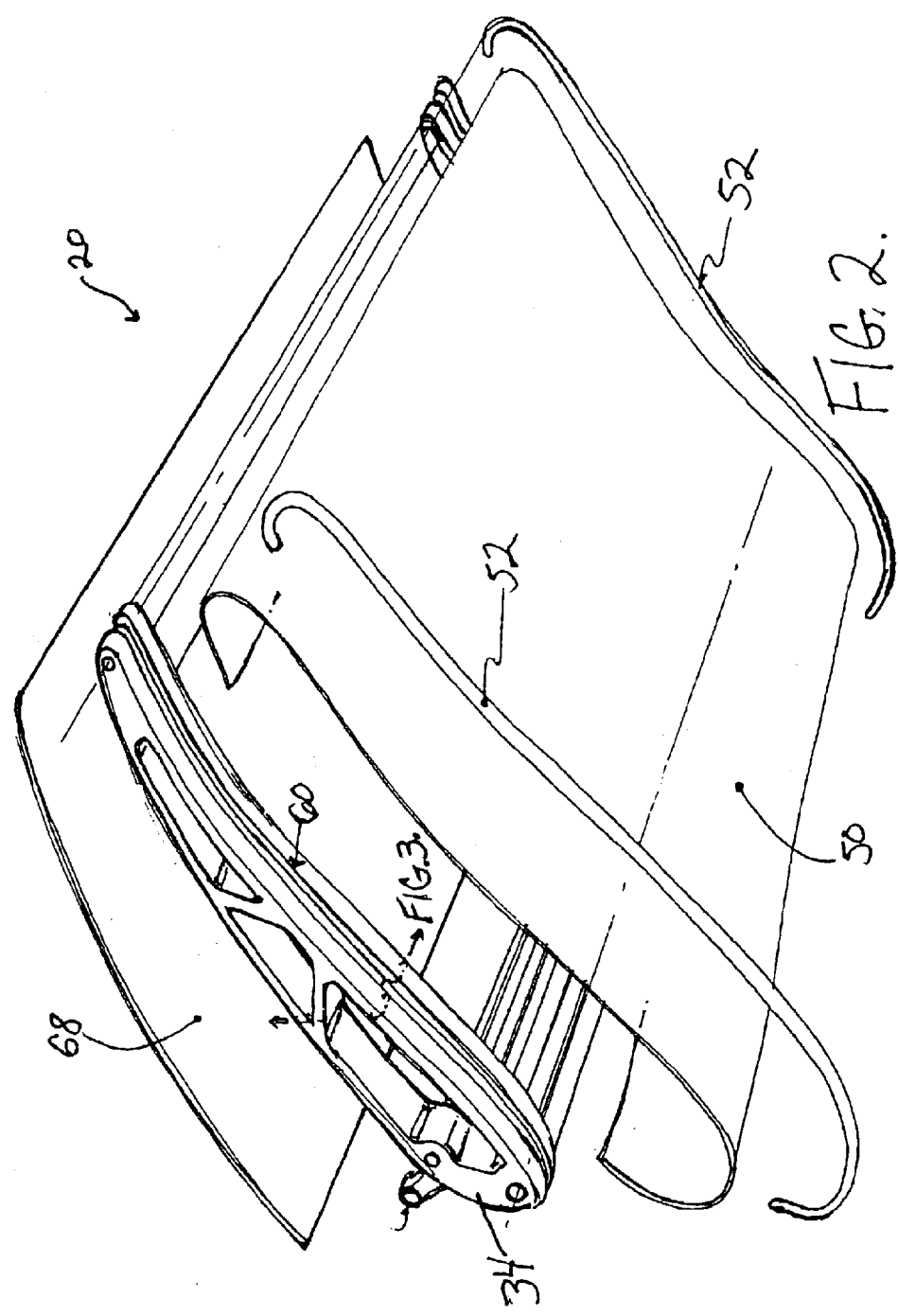
Figure 3:
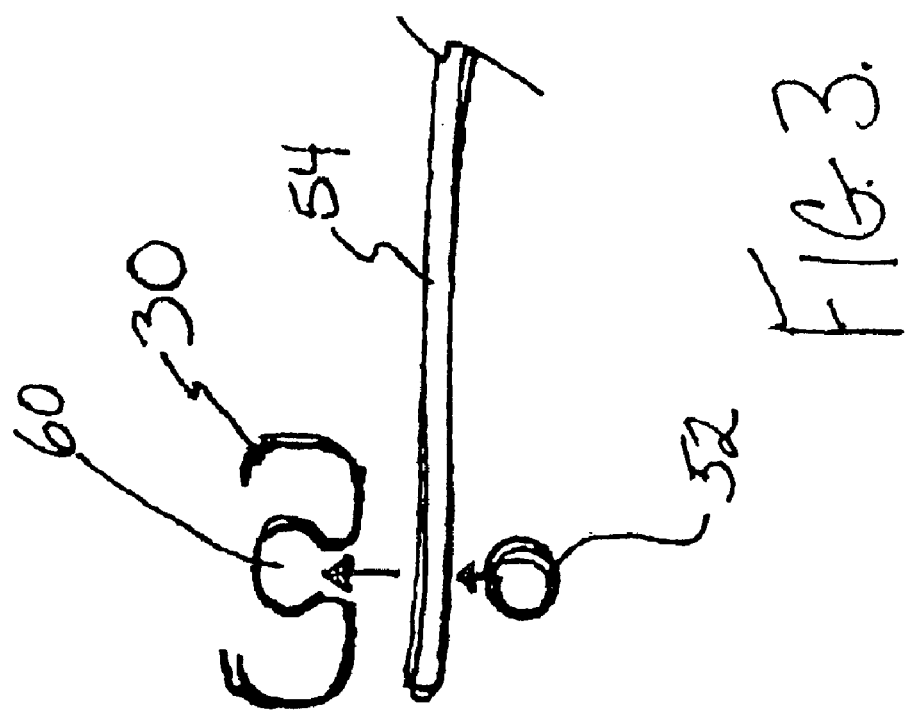
FIG. 3 illustrates a cross-sectional view of a portion of the ceiling structure shown in FIG. 1.

FIG. 2 illustrates a bottom perspective view of the exemplary ceiling structure 20. The material 50 is suitably connected to the side frames 32 and 34 using the splines 52 that secure the material 50 through a groove 60 within a bottom edge of each of the side frames 32 and 34. FIG. 3 illustrates a cross-sectional view of the connection that occurs between the splines 52, the material 50, and the grooves 60 within the frame 30. The material 50 is suitably long enough to wrap around and attach to the crossbeams 36 and 38. The covering material 50 is suitably a stretchable fabric that allows airflow between the ceiling and cabin area. In another embodiment, the covering material 50 is non-flammable. Also, other sections of material are suitably attached to the sides of the side frames 32 and 34 as necessary to cover exposed parts of the frame 30 (not shown). An upper panel 68 is attached to the top edge of the frame 30. The upper panel 68 reduces the effects caused by condensation on the interior wall of the aircraft ceiling and helps to reduce noise emanating from the aircraft. In one embodiment, the upper panel 68 is a light enhancement film that spreads light emanating from the light 54. Thus, the material 50 appears to be a consistently backlit with the light enhancement film.

Figure 4:
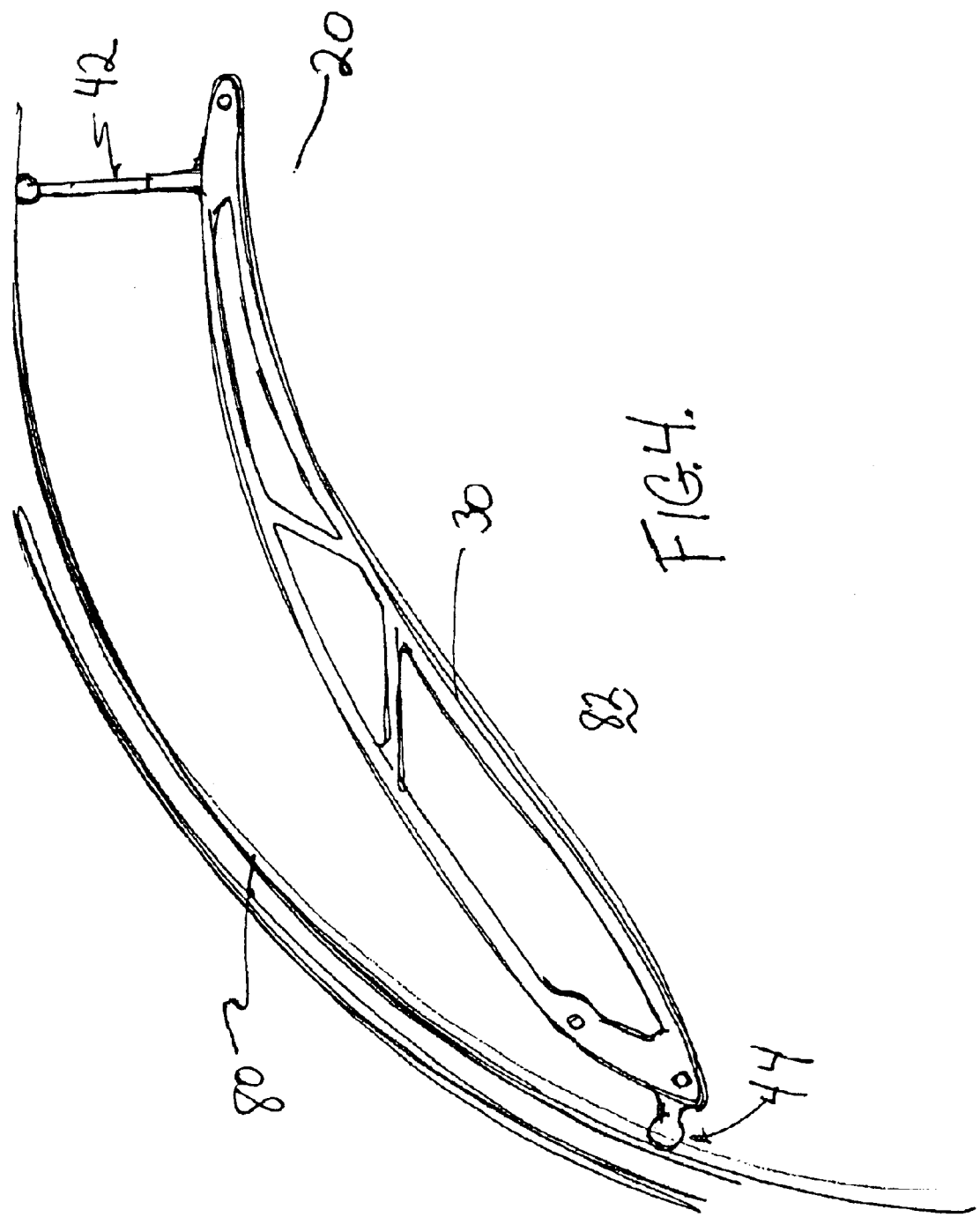
FIG. 4 illustrates a side view of the ceiling structure of FIGS. 1 and 2.

FIG. 4 illustrates a side view of the structure 20 mounted in place at the ceiling 80 of an aircraft cabin 82. The mounts 42 and 44 suitably attach to the ceiling 80 with mechanical attachment devices.

In one embodiment, the light 54 is electrically connected to an electric power cable (not shown) that travels along the interior of the aircraft. The light 54 suitably includes one or more low-power lights, such as without limitation LEDs or fiber optic filaments.

In another embodiment, the light 54 suitably includes a light projecting device, such as without limitation projecting fiber optics or laser (not shown). The projecting device is positioned on the frame 30 or on another structure within the aircraft cabin to produce images or graphical effects on the material 50. The light projecting device may be automatically or manually controlled by a controlling device, as desired.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A vehicle ceiling lining structure comprising:
    a frame formed according to a section of a ceiling of a vehicle;
    a light enhancement film attached to the frame;
    a fabric attached to the frame; and
    mounts coupled to the frame, the mounts being attachable to the ceiling,
    wherein the structure further includes a light attached to the frame.
2. The structure of claim 1, wherein the covering material is a stretchable fabric.
3. The structure of claim 1, wherein the light includes one or more LEDs.
4. The structure of claim 1, wherein the light includes one or more fiber optic filaments.
5. The structure of claim 1, further comprising quick release attachments that attach the frame to the mounts.
6. The structure of claim 1, wherein the structure further includes a back panel attached to the frame.
7. An aircraft ceiling lining structure comprising:
    one or more ceiling lining structures, each structure includes:
        a frame formed according to a section of a ceiling of an aircraft;
        a stretchable fabric attached to the frame;
        a light enhancement film attached to the frame;
        mounts coupled to the frame, the mounts being attachable to the ceiling; and
        one or more quick release attachments that attach the frame to the mounts,
        wherein the structure further includes a light attached to the frame.
8. The aircraft of claim 7, wherein the light includes one or more LEDs.
9. The aircraft of claim 7, wherein the light includes one or more fiber optic filaments.
10. The aircraft of claim 7, wherein the frame includes one or more molded plastic parts.
11. The aircraft of claim 7, wherein the structure further includes a back panel attached to the frame.
12. A method of making a vehicle interior ceiling lining, the method comprising:
    providing a frame formed according to a section of a ceiling of an aircraft;
    attaching a covering material to the frame;
    attaching the frame to the ceiling;
    attaching a light to the frame; and
    attaching a light enhancement film to the frame.
13. The method of claim 12, wherein the covering material is a stretchable fabric.
14. The method of claim 12, wherein the covering material is non-flammable.
15. The method of claim 12, wherein the light includes one or more LEDs.
16. The method of claim 12, wherein the light includes one or more fiber optic filaments.
17. The method of claim 12, wherein the frame includes one or more molded plastic parts.
18. The method of claim 12, wherein the frame is attached to the ceiling with quick release attachments.
19. The method of claim 12, further comprising attaching a back panel to the frame for providing a moisture barrier.
20. A vehicle lining structure comprising:
    a frame formed according to a section of a wall of a vehicle;
    a light enhancement film attached to the frame;
    a fabric attached to the frame; and
    mounts coupled to the frame, the mounts being attachable to the wall,
    wherein the structure further includes a light attached to the frame.
21. The structure of claim 20, wherein the covering material is a stretchable fabric.
22. The structure of claim 20, wherein the light includes one or more LEDs.
23. The structure of claim 20, wherein the light includes one or more fiber optic filaments.
24. The structure of claim 20, further comprising quick release attachments that attach the frame to the mounts.
25. The structure of claim 20, wherein the structure further includes a back panel attached to the frame.
26. A vehicle ceiling lining structure comprising:
    a frame formed according to a section of a ceiling of a vehicle;
    a fabric attached to the frame; and
    one or more mounts coupled to the frame;
    wherein the structure further includes a light attached to the frame;
    wherein the light includes one or more fiber optic filaments.
27. An aircraft ceiling lining structure comprising:
    one or more ceiling lining units, each unit includes:
        a frame formed according to a section of a ceiling of an aircraft;
        a light attached to the frame;
        a stretchable fabric attached to the frame;
        one or more mounts coupled to the frame, the mounts being attachable to the ceiling; and
        one or more quick release attachments that attach the frame to the mounts,
        wherein the light includes one or more fiber optic filaments.
28. A method of making a vehicle interior ceiling lining, the method comprising:
    providing a frame formed according to a section of a ceiling of an aircraft;
    attaching a covering material to the frame;
    attaching the frame to the ceiling; and
    attaching a light to the frame,
    wherein the light includes one or more fiber optic filaments.
29. A vehicle lining structure comprising:
    a frame formed according to a section of a wall of a vehicle;
    a fabric attached to the frame;
    one or more mounts coupled to the frame, the mounts being attachable to the wall; and
    a light attached to the frame, wherein the light includes one or more fiber optic filaments.

* * * * *